Patented June 1, 1937

2,082,297

UNITED STATES PATENT OFFICE 2,082,297

VEHICLE SEAT

Edwin W. Miller, Milwaukee, Wis.

Application February 28, 1936, Serial No. 66,299

2 Claims. (Cl. 155—101)

My invention relates to vehicle seats and more particularly to the type of seat used in automobiles.

The object of my invention is to provide a method of constructing the front seat adjoining the driver's seat in an automobile or the like, adjustable, so that the passenger occupying this seat may at will reverse the back rest so that he can face the passengers in the rear seat of the vehicle.

Another object of my invention is to provide a front seat for an automobile or the like that will enable the passengers to conveniently enter the vehicle. It has always been one of the principal disadvantages of a coach type of automobile body to have the front seat, adjoining the driver's seat, in the path of the passenger entering the automobile. With a seat constructed in the manner described in the specification this objection is largely overcome as it permits the changing of the back rest so as to remove it from the path of the passenger entering.

It will also be manifest to anyone familiar with automobile body construction that this type of construction permits a passenger in the front seat next to the driver to face the occupants of the rear seat, making it possible to better visit or carry on a conversation with them. The device is applicable to sedan as well as coach body construction.

The construction as shown also permits the pivoting of the seat on the shafts supporting same. The back rest causes the end of the platform engaged by the back rest, to contact the floor thereby raising the front end of the seat. This provides a more comfortable seat and adapts itself to the position of the occupant when the seat is constructed low as is the case in modern automobile design. However, the feature of pivotally mounting the seat is optional and need not be employed.

The dual lever construction incorporated in the device permits adjusting the back rest to any position, either forward or backward, with but a single radial movement without danger of its tipping.

In the accompanying drawing which forms a part of this specification,

Fig. 1 is a side view of the seat showing the mounting and lever arrangement.

Fig. 2 is a fragmentary view of one end of the device.

Fig. 3 is a fragmentary perspective view of one side of the seat showing the mounting and lever arrangements, and Fig. 4 is a view same as Figure 3, showing a vertical plate covering the lever mechanism.

Similar characters of reference indicate corresponding parts throughout the several views and referring now to the same, 10 is a seat cushion mounted on a rectangular platform 11 horizontally disposed, having downwardly projecting bearings 12, engaging a shaft 13, which shaft is journaled on both of its ends in angularly disposed floor brackets 14, fastened to the floor of the vehicle by means of a plurality of bolts 15 or the like.

The platform 11 has upwardly projecting members 16 at its outer four corners. There is a back rest provided with an upholstered section 17 and 17' supported by a frame 18, which frame 18 terminates into plates 19 at each of its sides. These plates 19 are provided with receiving slots 20 adapted to engage the projecting members 16 as shown.

On both sides of the seat and pivotally mounted at 21 and 21' on the floor brackets 14 and at 22 and 22' on the plates 19, are two levers 23, running parallel to one another. These levers support the back rest when engaging the projecting members 16 and keep the back rest in its correct position at right angle to the top of the cushion 10.

The cushion 10, on the platform 11, is pivotally mounted on the shaft 13 so that when the back rest is brought into engagement with two of the members 16, the weight of the back rest will raise the other end of the cushion 10 upward so as to provide a comfortable sitting angle. Resilient supports 24 are fastened to the bottom of the platform 11 for engagement with the floor.

In Figure 4 a vertically disposed plate 25 is shown employed as a guard to cover the lever mechanism. This is an optional design and is used to demonstrate the various modifications that may be made without in any way affecting the operativeness of the device.

The invention is susceptible to various changes in its form and minor details of construction, and the right is herein reserved to make such changes as properly fall within the scope of the appended claims.

Having thus described my invention, what I claim and desire to secure by Letters Patent in the United States, is:

1. A vehicle seat of the character described comprising a seat cushion, a platform supporting said cushion, said platform equipped with upwardly projecting members near the four corners, a shaft pivotally supporting said platform, a pair of angular floor brackets acting as journals for the ends of said shaft, a back rest equipped with a supporting frame terminating into two side plates, said side plates being provided with receiving slots for the upwardly projecting members on said platform, a plurality of levers pivotally fastened to each of said floor brackets and side plates, said levers employed to support and guide said back rest, and downwardly projecting members fastened to the outer edges of said platform for contact with the floor.

2. A seat of the character described comprising a seat cushion, a platform equipped with upwardly projecting members at its four outer edges, a shaft pivotally supporting said platform and cushion, a pair of floor brackets acting as journals for said shaft, a back rest provided with side plates, said side plates having receiving slots for engagement with said upward projecting members, two levers on each side pivotally attached to said floor brackets and side plates, said levers employed to support and guide said back rest, and downwardly projecting members on the outer edges of said platform for contact with the floor.

EDWIN W. MILLER.